United States Patent
Kochansky (10) Patent No.: US 7,584,138 B2
(45) Date of Patent: Sep. 1, 2009

(54) SYSTEM AND METHOD FOR PROVIDING AUTOMATED TRADE CONFIRMATION

(75) Inventor: Joseph M. Kochansky, New York, NY (US)

(73) Assignee: BlackRock Financial Management, Inc., New York, NY (US)

(*) Notice: Subject to any disclaimer, the term of this patent is extended or adjusted under 35 U.S.C. 154(b) by 1200 days.

(21) Appl. No.: 10/128,785

(22) Filed: Apr. 23, 2002

(65) Prior Publication Data

US 2003/0200171 A1 Oct. 23, 2003

(51) Int. Cl.
*G06Q 40/00* (2006.01)
(52) U.S. Cl. .................. 705/37; 705/35; 705/36 R
(58) Field of Classification Search .......... 705/35, 705/37, 36 R
See application file for complete search history.

(56) References Cited

U.S. PATENT DOCUMENTS

| | | | |
|---|---|---|---|
| 5,136,501 A * | 8/1992 | Silverman et al. | 705/37 |
| 5,305,200 A | 4/1994 | Hartheimer et al. | 364/408 |
| 5,375,055 A * | 12/1994 | Togher et al. | 705/37 |
| 5,497,317 A | 3/1996 | Hawkins et al. | 364/408 |
| 5,732,397 A | 3/1998 | DeTore et al. | 705/1 |
| 5,774,880 A | 6/1998 | Ginsberg | |
| 5,809,483 A | 9/1998 | Broka et al. | 705/37 |
| 5,857,176 A | 1/1999 | Ginsberg | |
| 5,924,082 A | 7/1999 | Silverman et al. | |
| 5,924,083 A | 7/1999 | Silverman et al. | |
| 5,950,176 A | 9/1999 | Keiser et al. | |
| 6,029,146 A * | 2/2000 | Hawkins et al. | 705/35 |
| 6,088,685 A | 7/2000 | Kiron et al. | 705/36 |
| 6,105,005 A | 8/2000 | Fuhrer | 705/35 |
| 6,134,535 A | 10/2000 | Belzberg | 705/37 |
| 6,134,600 A | 10/2000 | Liu | 709/316 |
| 6,230,201 B1 | 5/2001 | Guck et al. | 709/228 |
| 6,247,000 B1 * | 6/2001 | Hawkins et al. | 705/37 |
| 6,272,474 B1 | 8/2001 | Garcia | 705/37 |
| 6,347,307 B1 | 2/2002 | Sandhu et al. | 705/35 |
| 6,421,653 B1 * | 7/2002 | May | 705/36 R |
| 6,520,409 B1 | 2/2003 | Mori et al. | 235/380 |
| H2064 H * | 5/2003 | Buchalter | 705/37 |
| 2002/0007335 A1 * | 1/2002 | Millard et al. | 705/37 |
| 2002/0116314 A1 * | 8/2002 | Spencer et al. | 705/37 |
| 2002/0120546 A1 * | 8/2002 | Zajac | 705/37 |
| 2002/0143689 A1 * | 10/2002 | Naylor et al. | 705/37 |
| 2002/0156722 A1 * | 10/2002 | Greenwood | 705/37 |
| 2003/0041000 A1 * | 2/2003 | Zajac et al. | 705/37 |
| 2003/0088499 A1 * | 5/2003 | Gilbert et al. | 705/37 |
| 2003/0097325 A1 * | 5/2003 | Friesen et al. | 705/37 |

OTHER PUBLICATIONS

IntercontinentalExchange™ screen print e-Confirm website: https://www.econfirm.com/econfirmlogin/econfirmlogin.class, 2002.
IntercontinentalExchange™ screen print e-Confirm website: https://www.econfirm.com/docs/app/econfirm/login/faq.html, 2002; pp. 1-3.

(Continued)

*Primary Examiner*—Jagdish N Patel
*Assistant Examiner*—Sara Chandler
(74) *Attorney, Agent, or Firm*—Edwards Angell Palmer & Dodge LLP (57) ABSTRACT

A system and method for providing automated confirmation of transactions involving financial instruments by receiving transaction information from the transacting parties, storing the information until the transaction information is matched, and communicating the matched transaction information to the corresponding parties to confirm the terms of that transaction.

25 Claims, 8 Drawing Sheets

OTHER PUBLICATIONS

IntercontinentalExchange™ screen print e-Confirm website: https://www.econfirm.com/docs/app/econfirm/login/register.html, 2002.

IntercontinentalExchange™ screen print e-Confirm website: https://www.econfirm.com/docs/app/econfirm/login/contact.html, 2002.

* cited by examiner

FIG. 1

FIG_3

FIG_4

FIG_5

FIG_6

D

BLACKROCK
FILE  EDIT  VIEW  FAVORITES  TOOLS  HELP

ADDRESS:

BLACKROCK
SOLUTIONS  [INPUT EXECUTIONS]  [TODAY EXECUTIONS]  [BREAKDOWN CONFIRMATION]

FROM: BLACKROCK, INC. TRADING OPERATIONS  
PHONE: (212) 754-5320  
FAX: (212) 407-5666

TO: VALIDATION TEST BROKER  
CONTACT: NICHOLAS NORSE  
PHONE: 409-3360  
LOGIN: NMORSE@BLACKROCK.COM

236 —

| TRANSX | QUANTITY | PRODUCT | PRICE | FACTOR | YEILD | TRADE DATE | SETTLE DATE | NET MONEY |
|---|---|---|---|---|---|---|---|---|
| SELL | -10,000,000.00 | TBOND 5.37500 02/15/2031 ASSET ID:912810FP8 ISIN US12810FP85 | 100.49000000000 100.490000 | 1.0000000000 | 5.341334 | 02/05/2002 | 03/08/2002 | -10,080,180.94 |

NOTE: TRANSX (B/S) OF THE SECURITY IS PRESENTED IN BLACKROCK, INC. TRADING OPERATIONS PERSPECTIVE.

DELIVERY: FEDWIRE  
TST GNMA CONV

238 —

| TRADE # | ALERT TICKER | ACCOUNT NAME | TRADE ALLOCATION | NET MONEY | CURRENCY |
|---|---|---|---|---|---|
| 1441 | TESTCHECK | MOURNING CHECKOUT TEST PORTFOLIO | -10,000,000.00 | -10,080,180.94 | USD |

ATHORIZED BY: ADC AT 11:08  
SENT BY: JOESEPH KOCHANSKY AT 12:47

240 — [CONFIRM]  [RETURN]
                    — 242

FIG_7

E

BLACKROCK
FILE  EDIT  VIEW  FAVORITES  TOOLS  HELP

ADDRESS:

BLACKROCK
SOLUTIONS | INPUT EXECUTIONS | TODAY EXECUTIONS | BREAKDOWN CONFIRMATION

THE FOLLOWING BLOCK TRADE HAS BEEN CONFIRMED:

FROM: BLACKROCK, INC. TRADING OPERATIONS                  TO: VALIDATION TEST BROKER
                                                          CONTACT: NICHOLAS MORSE
PHONE: (212) 754-5320                                     PHONE: 409-3360
FAX: (212)407-5666                                        LOGIN: NMORSE@BLACKROCK.COM

236 —

| TRANSX | QUANTITY | PRODUCT | PRICE | FACTOR | YEILD | TRADE DATE | SETTLE DATE | NET MONEY |
|---|---|---|---|---|---|---|---|---|
| SELL | -10,000,000.00 | TBOND 5.37500 02/15/2031 ASSET ID:912810FP8 ISIN US12810FP85 | 100.49000000000 100.490000 | 1.0000000000 | 5.341334 | 02/05/2002 | 03/08/2002 | -10,080,180.94 |

NOTE: TRANSX (B/S) OF THE SECURITY IS PRESENTED IN BLACKROCK, INC. TRADING OPERATIONS PERSPECTIVE.

DELIVERY: FEDWIRE
TST GAMMA CONV

238 —

| TRADE # | ALERT TICKER | ACCOUNT NAME | TRADE ALLOCATION | NET MONEY | CURRENCY |
|---|---|---|---|---|---|
| 1441 | TESTCHECK | MOURNING CHECKOUT TEST PORTFOLIO | -10,000,000.00 | -10,080,180.94 | USD |

ATHORIZED BY: ADC AT 11:08
SENT BY: JOESEPH KOCHANSKY AT 12:47

242 — [RETURN]

FIG_8

SYSTEM AND METHOD FOR PROVIDING AUTOMATED TRADE CONFIRMATION

BACKGROUND OF THE INVENTION

1. Field of the Invention

The subject disclosure is directed to a system and method for providing transaction confirmations, and more particularly, to a system and method for providing trade confirmations to counter parties involved in a transaction over a distributed computing network.

2. Background of the Related Art

Portfolio managers deal with many collateral business issues arising out of daily investment practices. Many of these collateral business issues are seemingly simple procedural or administrative tasks. However, such tasks are often delayed during the course of the day while focusing on other more challenging matters. Although delaying these simple tasks may appear innocuous, the consequences of failing to properly address them may have devastating business and legal implications.

The potential for liability is especially high when portfolio managers handle transactions (also referred to as "trades") involving financial instruments in portfolios in their care. The term "portfolio managers" as used herein generally refers to the agents that effectuate the terms of a transaction involving financial instruments (i.e., transfer of ownership, receipt of money, etc.) for portfolios of financial instruments owned by others. For the portfolio manager, maintaining records of transactions and confirming all details of the transactions prior to their execution is a prudent business practice, if not one required by law.

In the past when counter parties agreed on the terms of a transaction, the information would be sent independently by both counter parties to the portfolio manager for execution. The portfolio manager would then manually match the information received, which may have been sent by facsimile at different times during the day.

The volume of transactions within any given day may be extremely high. Indeed, there may be thousands of trades affecting thousands of portfolios under the portfolio manager's care. Thus, the portfolio manager must continually check through the many sets of transaction information (i.e., one from each counter party) to find matching sets. In the past when a match was found, the portfolio manager would confirm the transaction with the counter party by either telephone or facsimile. Typically, the manager would also send a document containing the transaction details to one or both of the parties for their signature. The executed document would then be returned and kept as a record of their confirmation.

In the situation where the portfolio manager is one of the transacting counter parties, or an associate of the same organization or entity as one of the counter parties, the transaction matching and confirmation process varied only slightly. Generally, obtaining additional documentation illustrating confirmation of a transaction would be requested only of the other non-associated transacting party.

The extremely fast pace operation of the financial industry makes obtaining confirmations difficult. A high volume of trades involving various amounts of financial instruments occur daily, altering the assets in a substantial number of portfolios, which makes the process of matching and confirming transactions inconvenient, unreliable, and time-consuming for all parties involved.

Consequently, there exists a need for a system and method for receiving transaction information, and matching and confirming the transactions in a more convenient, reliable, and efficient manner which is likely to be complied with by all those involved.

SUMMARY OF THE DISCLOSURE

In summary, the present disclosure is directed to a system and method for automatically confirming transactions in a more reliable, efficient and convenient manner. In particular, the present disclosure is directed to a system for providing automated confirmation of a transaction involving financial instruments. A system constructed in accordance with the present disclosure includes: means for receiving data from counter parties to a transaction (i.e., the buyers and sellers involved in each transaction); a database for storing the data received from the counter parties; means for matching substantially correspondent sets of information stored in the database; and means for communicating each matched set of information to at least one of the counter parties to the transaction from which one of the sets of information was received.

Preferably, the data includes a set of information relating to a transaction involving financial instruments which occurred between the first party and the second party. The set of information may include the type of transaction, CUSIP number, financial instrument share price, quantity of financial instruments involved in the transaction and settlement date. Preferably, the present system includes means for excluding the matched sets of information from the data received from the counter parties in the database.

In one embodiment of the aforementioned system, the means for receiving data from either the counter parties is through a distributed computing network. In another embodiment of the aforementioned system, the means for receiving data from the counter parties is through a data receiving device, such as a connection with the world wide web or wireless data transmitter. The data may also be received by the instant system through a graphical user interface.

In another embodiment of the aforementioned system, the means for matching substantially correspondent sets of information stored in the database is a data processing device. The device may match sets of transaction information of the same type of transaction, CUSIP number, financial instrument share price, quantity of financial instruments involved in the transaction and settlement date.

In another embodiment of the aforementioned system, the means for communicating each matched set of information to at least one of the counter parties to the transaction from which one of the sets of information was received is a data transmitting device, such as a connection with the world wide web or wireless data transmitter. Also, the data may be communicated through a web page having an address on the world wide web, or through a graphical user interface.

In another embodiment, the aforementioned system includes a means for receiving confirmation of the transaction data from each of the counter parties that receive a communication. Transaction confirmation data may be received via a data receiving device, such as a connection with the world wide web or wireless data transmitter. The data may also be received by the instant system through a graphical user interface. In yet another embodiment of the aforementioned system, the instant system also includes a database for storing the transaction confirmation data.

The present disclosure is also directed to a method for providing automated confirmation of transactions involving financial instruments. This method includes the steps of: receiving data from counter parties to a transaction; storing the data received from the counter parties in a database; matching substantially correspondent sets of information stored in the database; and communicating each matched set of information to at least one of the counter parties to the transaction from which one of the sets of information was received.

Preferably, the data received includes a set of information relating to a transaction involving financial instruments and may include the type of transaction, CUSIP number, financial instrument share price, quantity of financial instruments involved in the transaction and settlement date.

In addition, the aforementioned method may also include receiving transaction confirmation data from the counter parties receiving the communication. The instant method may also include storing the transaction confirmation data in a database. In one aspect of the aforementioned method, the counter parties may be provided with a means for sending data to the database, such as via a web site, distributed computing network or telephone data entry system. In another aspect, the aforementioned method may also include the step of providing a means for viewing each matched set of information through a graphical user interface or on a web site having an address on the world wide web. In another aspect of the aforementioned method, communicating each matched set of information to at least one party to the transaction from which one of the sets of information was received may include transmitting data to the world wide web.

The present disclosure is also directed to a system for providing automated confirmation of transactions between a first party, such as a portfolio manager or an associate of the portfolio manager, and one or more second parties, such as a broker/dealer. The system may include: means for the first party and one or more second parties to enter data; a database for storing the data entered by the first party and the one or more second parties; means for matching substantially correspondent sets of information stored in the database; means for communicating matching sets of information to each of the one or more second parties to the transaction.

Preferably, the data includes a set of information relating to transactions involving financial instruments between the first party and each of the one or more second parties. In addition, the aforementioned system may further include means for receiving transaction confirmation data from each of the one or more second parties receiving the communication and a database for storing the transaction confirmation data.

In one embodiment of the aforementioned system, the means for entering data is through a graphical user interface.

In another embodiment of the aforementioned system, the means for matching substantially correspondent sets of information stored in the database is a data processing device.

In another embodiment of the aforementioned system, the means for communicating matching sets of information to the second parties involved in each transaction is a connection with the world wide web. In another embodiment of the aforementioned system, the means for communicating matching sets of information to each of the second parties to the matched transactions is through a web page on the world wide web. In another embodiment of the aforementioned system, the means for receiving transaction confirmation data from the second parties receiving the communication is a connection with the world wide web.

The present disclosure is also directed to a machine readable media for providing automated confirmation of transactions involving financial instruments. The machine readable media may include data segments for storing data from a first party relating to a transaction involving financial instruments between the first party and a second party, storing data from a second party relating to a transaction involving financial instruments between the second party and a first party and storing transaction confirmation data.

The machine readable media may also include code segments for receiving the first and second party data, matching substantially correspondent first and second party stored data, communicating the matched data to at least one party, and receiving the transaction confirmation data from the at least one party receiving the communication.

These and other unique features of the system and method disclosed herein will become more readily apparent from the following description of the drawings.

BRIEF DESCRIPTION OF THE FIGURES

So that those having ordinary skill in the art to which the subject invention pertains will more readily understand how to make and use the system of the subject invention, embodiments thereof will be described in detail herein below with reference to the figures, wherein:

FIG. 6 is an example of a graphical user interface illustrating a summary table of the confirmation status of the transactions inputted into a system in accordance with the present disclosure;

DETAILED DESCRIPTION OF THE PREFERRED EMBODIMENTS

The subject disclosure is directed to a new and useful system and method for performing portfolio management tasks in the form of a distributed computing network configured to receive and confirm the details of a transaction between the transacting counter parties. Use of the present disclosure in conjunction with portfolio management is exemplary of the type of activity for which the present disclosure is well suited. Those skilled in the art will readily appreciate that a system in accordance with the present disclosure may be used in, and well suited for, other activities as well.

Those skilled in the art will also readily appreciate that a system configured in accordance with the present disclosure includes the various computer and network related software and hardware used in a distributed computing network, that is, programs, operating systems, memory storage devices, input/output devices, data processors, servers with links to data communication systems, wireless or otherwise, such as those which take the form of a local or wide area network, and a plurality of data transceiving terminals within the network, such as personal computers. Those skilled in the art will further appreciate that, so long as users are provided local and remote access to a system configured in accordance with the present disclosure, the precise type of network and associated hardware are not vital to its full implementation.

Figure 1:
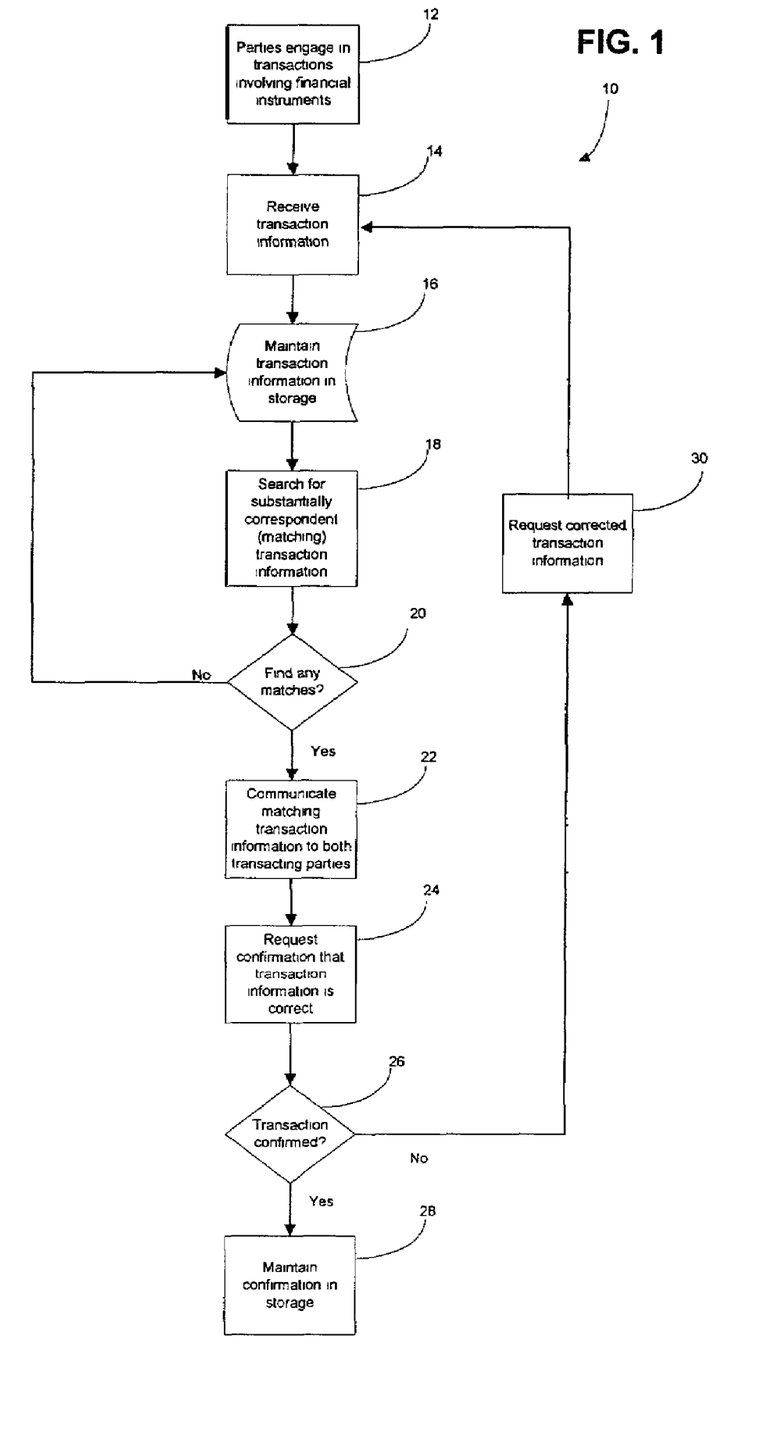
FIG. 1 is a flow diagram illustrating the method steps associated with an automated confirmation system constructed in accordance with the present disclosure.

Referring now to FIG. 1, a flow diagram is provided to illustrate the basic functions of a system 10 constructed in accordance with the subject disclosure which implements the novel method also disclosed herein. Preliminarily (i.e., before entry into system 10), there are a plurality of two party (or counter party) transactions involving financial instruments which occur, as illustrated at step 12. It is envisioned that each set of transacting parties would likely include a trader and a broker/dealer. However, the parties may be thought of in simple terms as buyers and sellers, in that consideration (i.e., money) has been given in return for the transfer of ownership and corresponding legal rights to certain financial instruments. Ultimately, the relationship of the parties and terms of the transaction are incidental to the functions of system 10. It is sufficient for system 10 to just receive information, which is referred to as transaction information, that a change of ownership of certain financial instruments is to be effected, as illustrated at step 14.

As shown at step 16, the transaction information received by system 10 is maintained in storage. Preferably, the transaction information is saved in a database in a computerized memory device (See FIG. 3). System 10 contemplates receiving transaction information from both transacting parties, as is common practice in portfolio management. At step 18, system 10 searches the stored transaction information for matching entries. Preferably, such searches are performed periodically throughout the day.

For example, in the typical scenario, wherein the parties involved in the transaction are a broker/dealer and a trader, Trader A buys 100 shares of XYZ bonds at $100 each from Broker/Dealer B for a portfolio owned by ABC, Inc ("ABC's portfolio). Having agreed upon the terms of a transaction involving financial instruments, the deal is consummated by the actual transfers of $10,000 from ABC's portfolio to Broker/Dealer B and 100 shares of XYZ bonds from Broker/dealer B to ABC's portfolio. Thus, Trader A and Broker/Dealer B would submit their transaction information to system 10 to effectuate the transfers.

The traders and broker/dealers submit their information independently, often resulting in a difference of time in receiving information from the corresponding parties to each transaction. The time difference between submissions of information from the parties may differ by minutes or even hours. System 10 compensates for this eventuality by storing all submissions and then pooling them for matching information. In the example above, the names of the transacting parties and portfolio (i.e., Trader A, Broker/Dealer B, and ABC's portfolio) and/or the amount, price and type of financial instruments involved (i.e., 100 shares of XYZ bonds at $100 per share), may be used as identifiers to facilitate the matching process.

At step 20, if no matches are found, system 10 continues to maintain the transaction information in storage, presumably awaiting the receipt of corresponding information at a later time. If any two sets of transaction information are matched during the search at step 18, the matched transaction information is automatically communicated to at least one of the transacting parties at step 22. Alternatively, the transaction information may be communicated to both transacting parties for confirmation. Preferably, the matching sets of transaction information are marked or otherwise indicated for exclusion from future matching searches through the database. The process of flagging corresponding sets enhances the efficiency of system 10 by, among other things, conserving processing time. The communication of the transaction information may be accomplished via any automated service that requires no human intervention, such as computer-initiated facsimiles, electronic mail or posting to a web site which is available to the parties by accessing the world wide web. It is preferable to use secure access codes or the like which prevent unauthorized receipt of the communication.

At step 24, system 10 requests confirmation of the transaction information from both parties involved in the transaction. Alternatively, only one party may be asked to confirm the transaction. Furthermore, notification may also be sent without requesting confirmation, thus relying on the assumption that no response from the parties after a prescribed period of time is indication that the transaction information is correct as communicated. However, in this embodiment, confirmation is requested and may be received by returning a facsimile, electronic mail, or otherwise indicating confirmation via a web site posting.

At step 26, if the transaction information is confirmed as correct, the confirmations are maintained in a suitable form for storage at step 28. If the transaction information is incorrect, the transacting parties are provided the opportunity to transmit corrected information at step 30. As illustrated in FIG. 1, the corrected transaction information is treated by system 10 as if it was first receiving the transaction information at step 14. Thus, the corrected transaction information would be stored until matched by system 10 at steps 16, 18 and 20, and then communicated to the transacting parties at step 22, as described previously.

Figure 2:
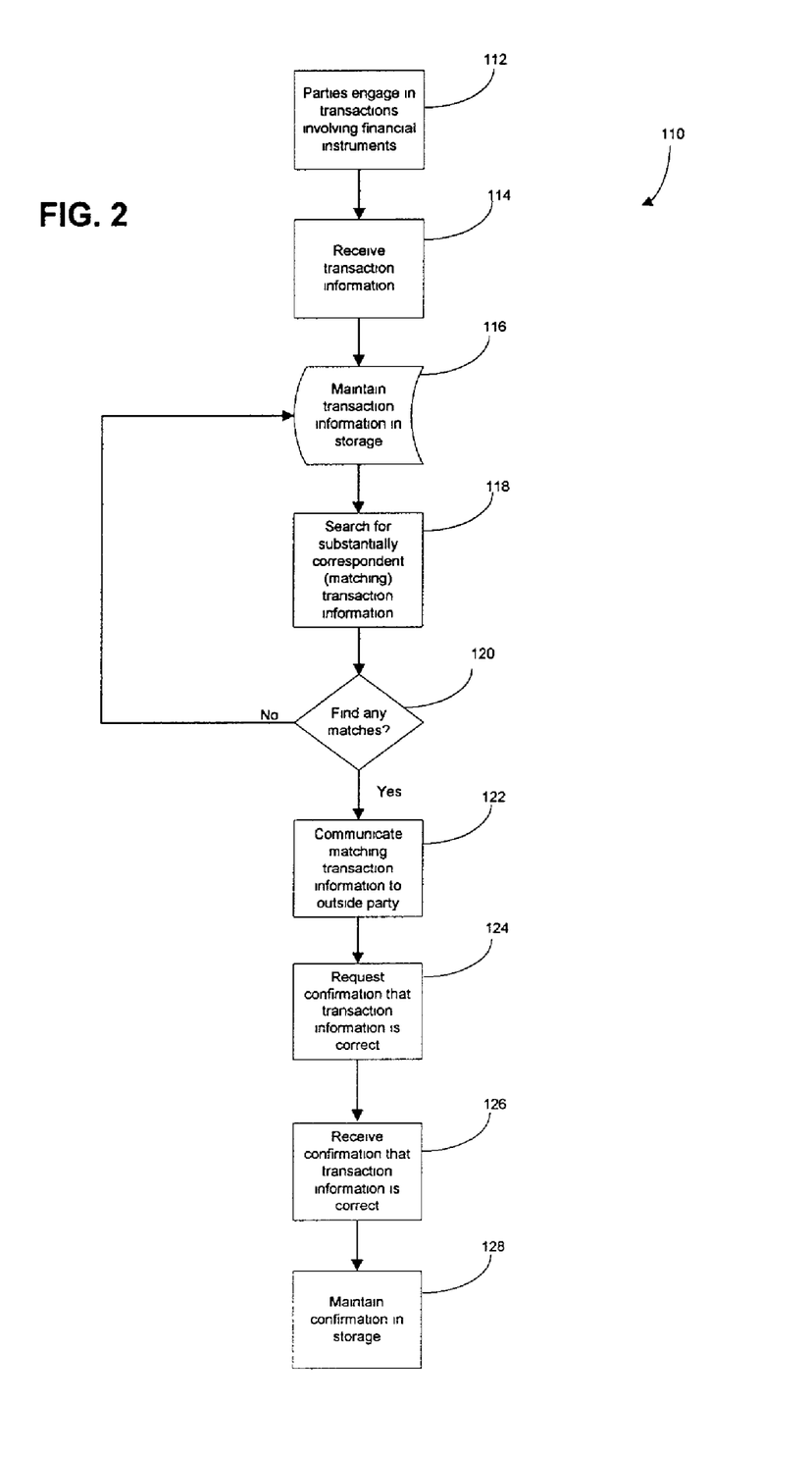
FIG. 2 is a flow diagram illustrating the method steps associated with another embodiment of an automated confirmation system constructed in accordance with the present disclosure.

FIG. 2 illustrates another embodiment of a system and method in accordance with the present disclosure. System 110 is similar to system 10, except that system 110 contemplates and is adapted for performing similar portfolio management functions in an organizational but departmentalized setting, where individuals performing portfolio management are associated in the same business entity with one of the parties to a transaction. This also includes the portfolio managers employed or contracted as agents to make decisions, such as whether to buy or sell financial instruments, regarding portfolios of financial instruments owned by others. Portfolio managers who are transacting parties or associated with transacting parties, are referred to herein as being "inside" or "in-house" sources of transaction information, whereas the counter (non-associated) transacting parties are referred to herein as being "outside" sources.

Thus, a transaction agreed to by parties at step 112 results in system 110 receiving transaction information from an in-house source transacting party and outside source transacting party at step 114. Transaction information may be sent from both parties via electronic mail to a system 110 receiving address. Alternatively, interactive graphical interfaces, such as those used as forms for data entry in world wide web sites may be used. Preferably, different interfaces are provided for in-house and outside parties. The transaction information is stored at step 116 and, as in the previous embodiment, system 110 searches the stored transaction information at step 118 and locates those which substantially match at step 120.

In this embodiment, a communication of the transaction information for confirmation is sent only to the outside transacting party at step 122. Presumably, confirmation is not necessary from the in-house transacting party because the in-house party is associated with the in-house portfolio manager. Confirmation is requested at step 124 and is received at step 126. This embodiment does not except corrected transaction information in lieu of confirmation. Alternatively, further communication via electronic mail may utilized to correct the information. However, once confirmation is received it is stored in an appropriate format at step 128.

Figure 3:
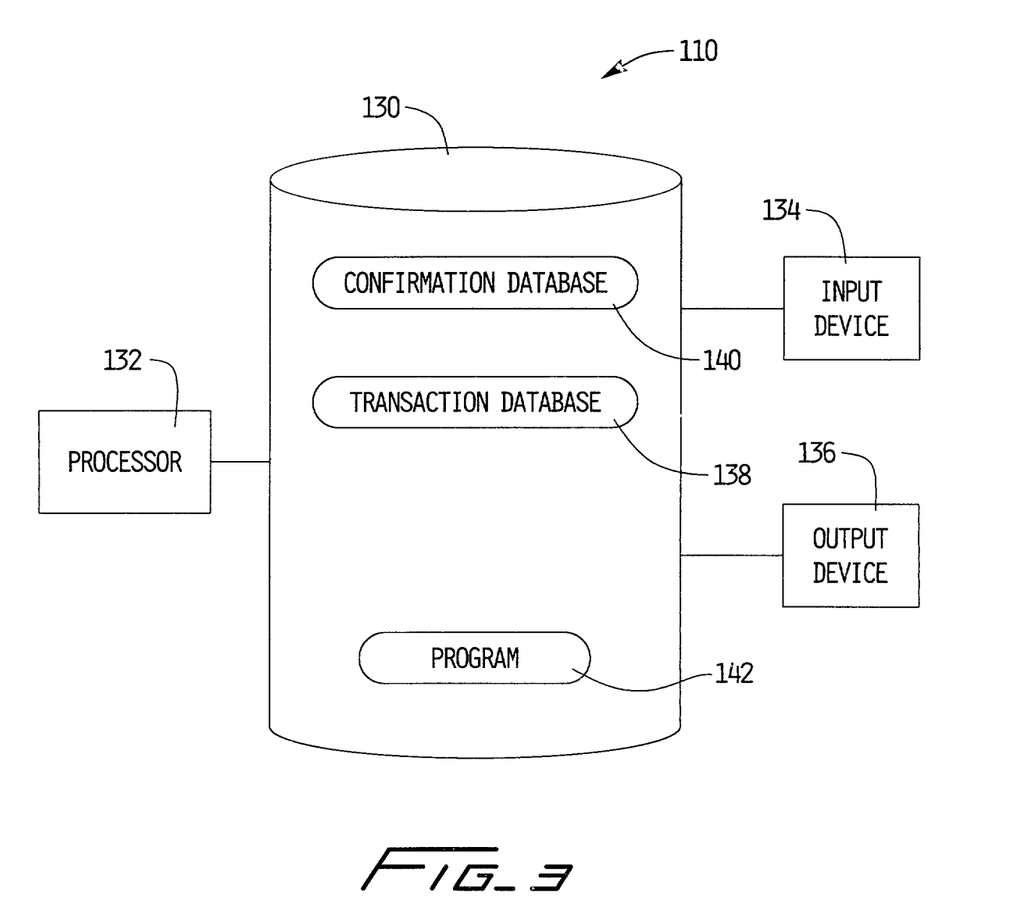
FIG. 3 is a schematic diagram depicting the core functional components of a computer-based system for implementing the method in accordance with the embodiments of the present disclosure shown in FIGS. 1 and 2.

There is illustrated in FIG. 3, a schematic representation of an exemplary computerized system 110 constructed in accordance with the present disclosure for performing the process steps shown in FIG. 2. Thus, system 110 is adapted and configured to receive, store, search and match transaction information, and send, receive, and store confirmation of transaction information automatically, among other things.

System 110 includes a data storage device or memory 130 and a processor 132, such as an pentium-based microprocessor, which is operatively associated with the memory 130 for managing the flow of data throughput. A data input receiver 134 is operatively associated with the memory 130 and processor 132 for receiving transaction information data, confirmation data and instructions from a portfolio manager or transacting party, and a data output device 136 is operatively associated with the memory 130 and processor 132 for communicating information to a transacting party. The input and output devices may be data transmitters or receivers, or alternatively one data transceiving device. The input and output of data may be via a web site on the world wide web, Intranet, Internet, local area network (LAN), distributed computing network, connection with an electronic data transfer system or any other system or device capable of communicating data.

The memory 130 contains a plurality of cooperative relational databases. These databases include transaction information database 138 which stores transaction information for a plurality of transactions, and a transaction confirmation database 140 for storing a plurality of confirmations from transacting counter parties. The information may include financial instrument identification, names of parties involved, price of the instrument, quantity transacted, etc. Financial instruments may include, among other things, fixed income securities such as Treasury notes, Government, Corporate and Agency bond issues, mortgage backed securities, money market instruments, equities, currencies and derivative instruments.

Memory 130 also stores a program 142 containing an instruction set written in a conventional computing language such as C++ or Java, for coordinating the interactive relationship between the memory 130, the processor 132, and the input and output devices 134, 136. In addition, program 142 is adapted and configured to perform the matching process.

FIGS. 4-8 illustrate exemplary graphical interfaces (hereinafter referred to as screens) which may be used in accordance with a system and method of the present disclosure substantially corresponding to system 110 discussed above. Preferably, screen interfaces used in accordance with the present disclosure incorporate user-friendly features designed to fit seamlessly with the most common operating system interfaces. Thus, the screens are in a framed form having embedded links to other screens, borders, multiple folders, toolbars with pull-down menus and various other features which are accessible by depressing (i.e., "clicking" or "double-clicking") on animated graphical representations of buttons or tabs, among other things. Generally, features of system may be accessed via a connected mouse, keyboard, voice command or other commonly used tool for indicating preference in a computerized graphical interface. It is contemplated that various types of software may be used in conjunction with a system in accordance with the present disclosure, such as software, commonly referred to as "browsers," which are designed to search, access and display sites having electronic addresses on the world wide web.

Figure 4:
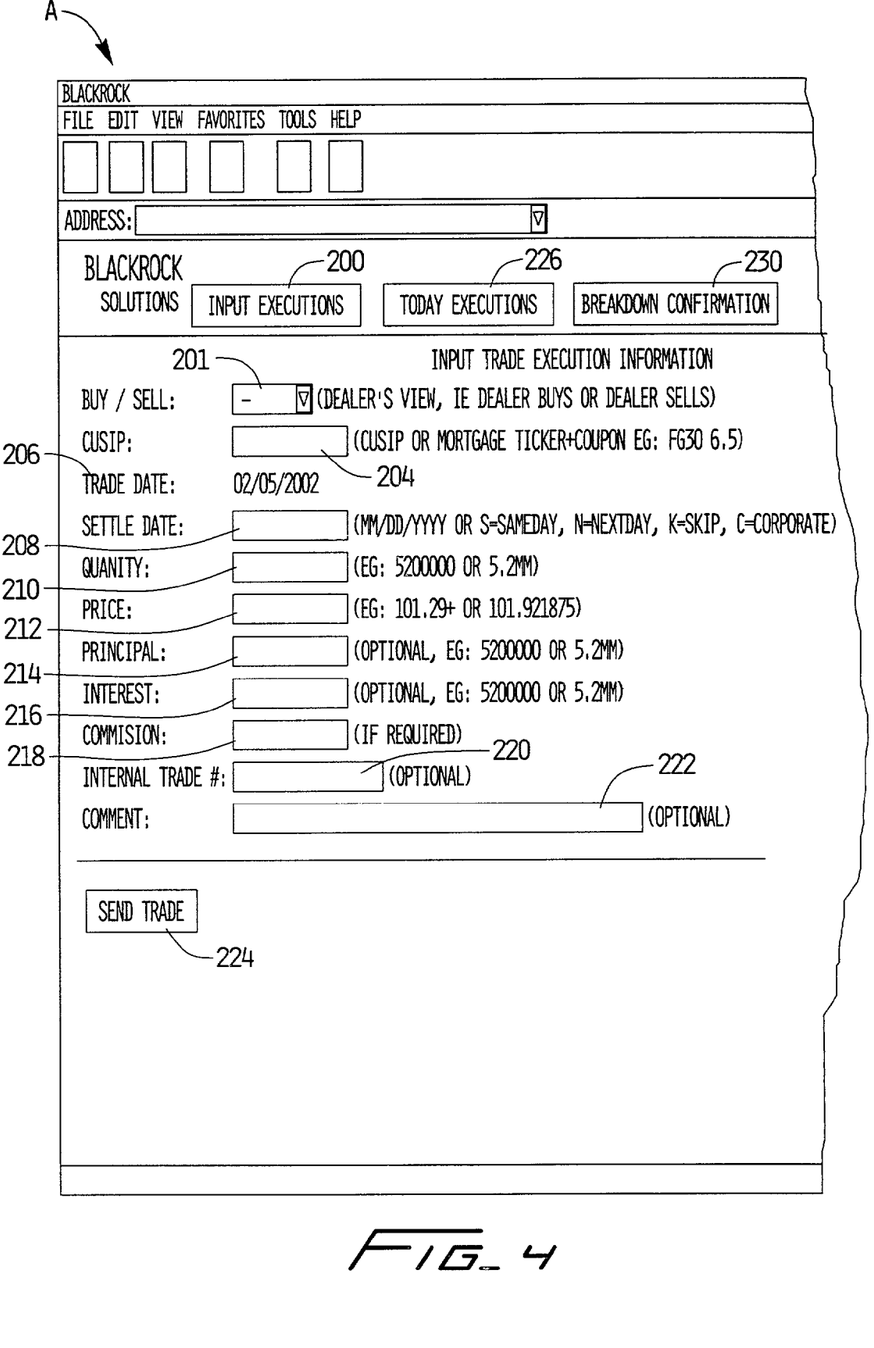
FIG. 4 is an example of a graphical user interface of form for entering transaction information into a system in accordance with the present disclosure.

FIG. 4 illustrates an interactive data entry form, referred to as screen "A," for inputting transaction information into system 110 which may be accessed via input executions button 200. Various fields for receiving transaction information are included in screen A. A transacting party would enter the appropriate description in a buy/sell field 202 having a conventional "drop-down" menu of preset descriptions from which one may be chosen. In this embodiment, buy/sell field 202 provides an overview of the transaction taken from the dealer side (i.e., whether or not the dealer is either buying or selling the financial instruments to the in-house portfolio manager). The Committee on Uniform Security Identification Procedures (CUSIP) number, mortgage ticker and coupon number, or some other unique identifier of the financial instrument involved in the transaction is entered in security identification field 204. The trade date 206 is shown as the current date on screen A but may alternatively require entry in a field. There is also a settle (or settlement) date field 208, quantity (of financial instruments involved in the transaction) field 210, price field 212, principal field 214, interest field 216, commission field 218, internal trade number field 220, and comment field 222. In this embodiment, certain fields are optional, such as principal field 214, interest field 216, commission field 218, internal trade number field 220 and comment field 222. For convenience sake, illustrative text depicting the type and format of entries to be inputted are disposed adjacent each corresponding field. In addition, "short-cut" keys are available for certain fields which allow for quicker entry of data. For example, in settle date field 208, inputting an "S" signifies the current or same day as the trade date.

The send trade button 224 is depressed after the transaction information is input into the fields which transmits the information to system 110 for storage and matching with corresponding information sent by the other transacting party. The system finds corresponding information by comparing certain fields. Preferably, the system is configured to not accept transaction information unless buy/sell field 202, security identification field 204, settle date 208, quantity field 210 and price field 212 contain appropriate information. The total amount of money for the transaction may be calculated by multiplying the quantity of the financial instrument involved by its price. Preferably, the transaction information in buy/sell field 202, security identification field 204, settle date 208, quantity field 210 and price field 212 is used to match with transaction information submitted by the other transacting party.

Figure 5:
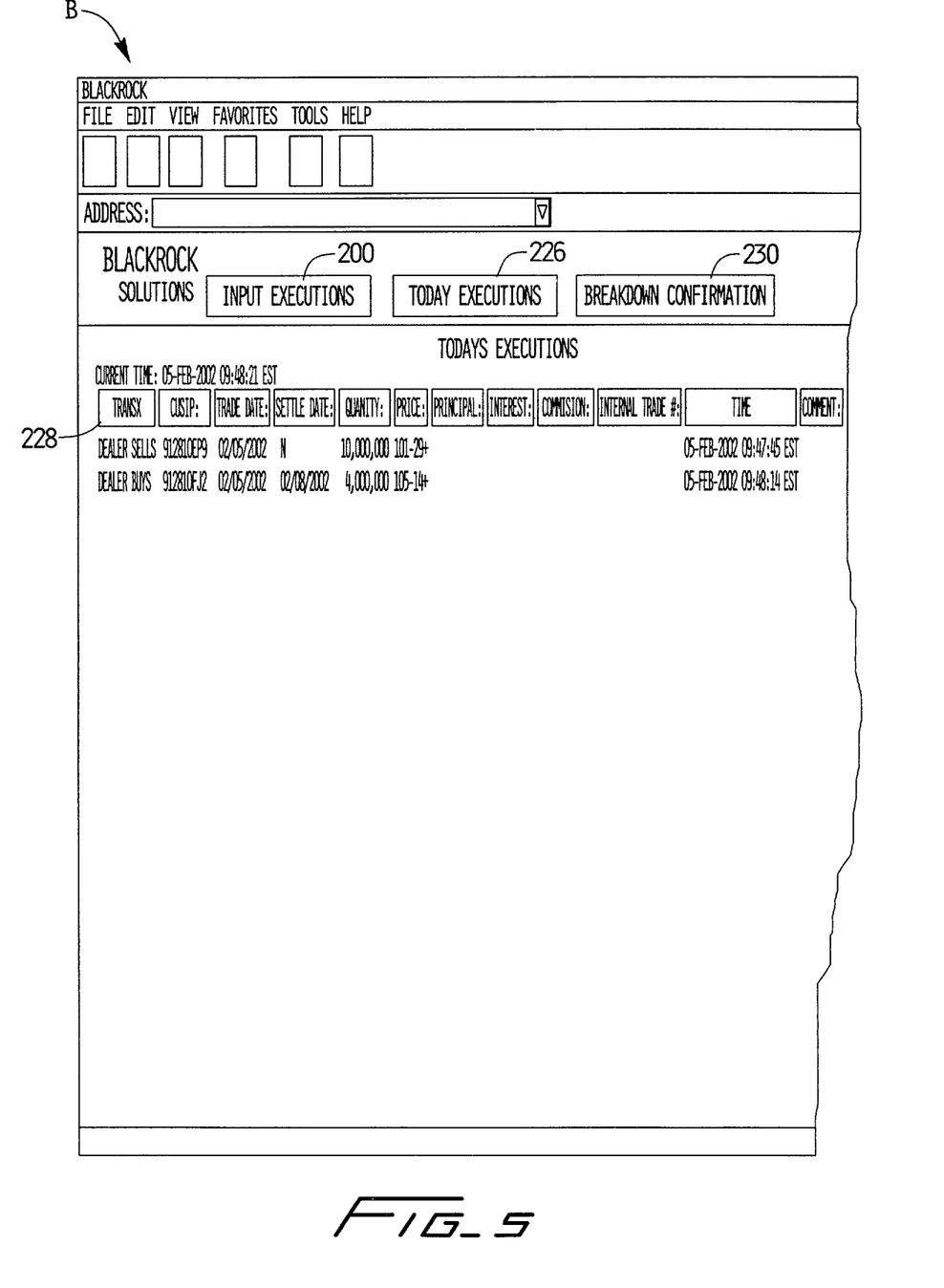
FIG. 5 is an example of a graphical user interface illustrating a summary table of transactions inputted into a system in accordance with the present disclosure.

FIG. 5 illustrates screen "B" comprising a list of the current day's executions (i.e., all inputted transactions) up to the point in time when the today's executions button 226 is actuated. Preferably, all the inputted transaction information for each entered transaction including the time entered is displayed in tabular form for on-screen review, such as table 228 in screen B.

Actuating the breakdown confirmation button 230 provides screen "C" as illustrated in FIG. 6. Screen C contains a table 232 listing the executions which have not been confirmed and a table 234 listing the transaction information for the confirmed transactions along with the confirmation date and time.

Figure 7:
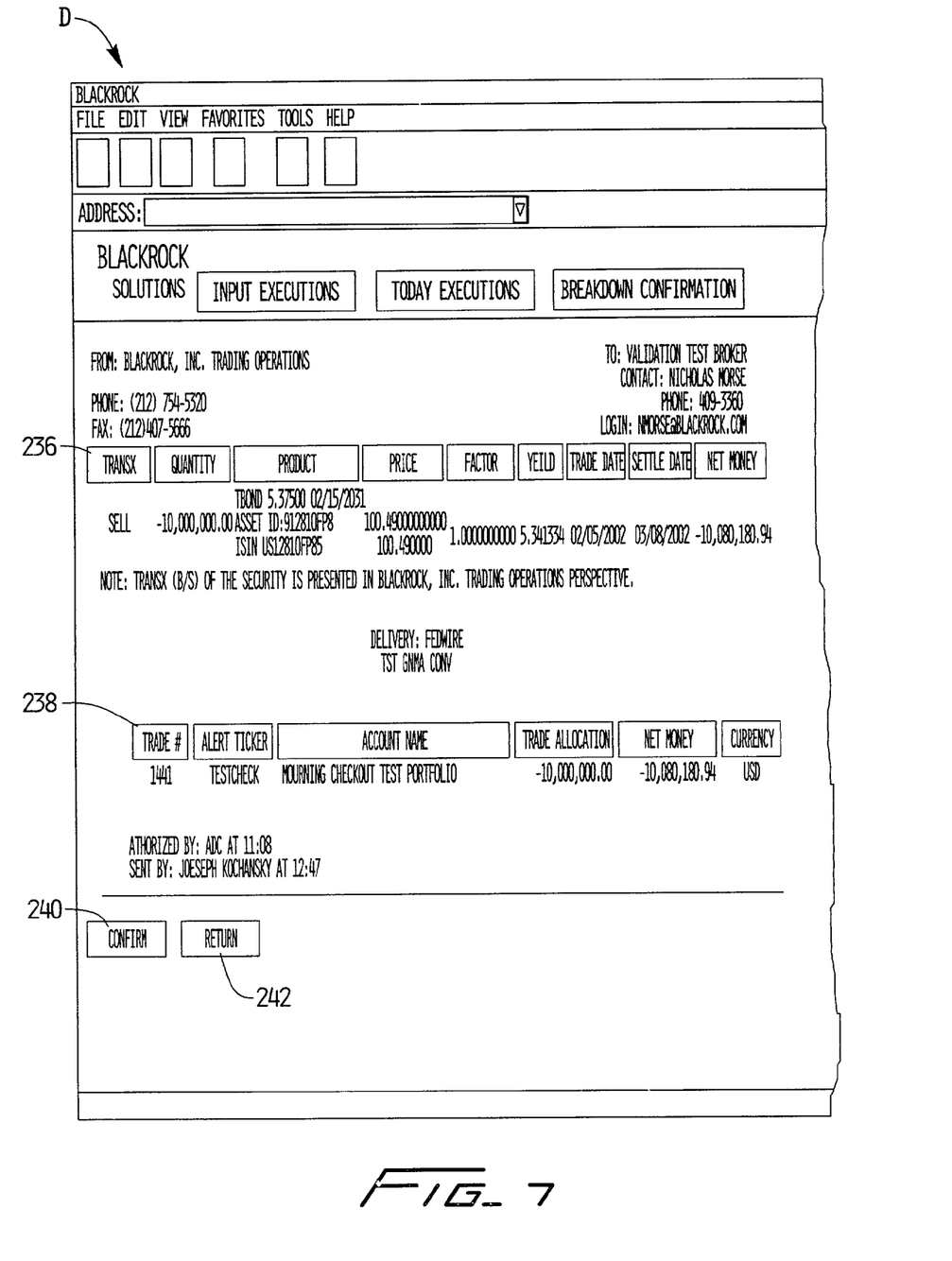
FIG. 7 is an example of a graphical user interface illustrating a communication of transaction information to a transacting party to obtain confirmation of the transaction thereof which has been inputted into a system in accordance with the present disclosure.

To obtain confirmation, a screen "D" shown in FIG. 7 is posted to a web site on the world wide web, thus allowing access to outside transacting parties having access to the world wide web. Preferably, each outside transacting party would have an established account with a password so that access to screens displaying transactions the particular party is involved in is secure. Tables 236 and 238 contain the transaction information, total amount of money involved and corresponding portfolio information for the outside party to review and confirm. Preferably, the outside party is presented with screen D upon logging in having one transaction displayed thereon. Alternatively, the party may access screen D via "double-clicking" or otherwise selecting an unconfirmed execution in table 232. Pressing the confirm button 240 confirms the transaction displayed, while pressing return 242 brings the party back to screen C without confirming the transaction unless button 240 was depressed previously. If a transaction has not been confirmed after a preset period of time, messages may be sent via electronic mail or facsimile as reminders.

Figure 8:
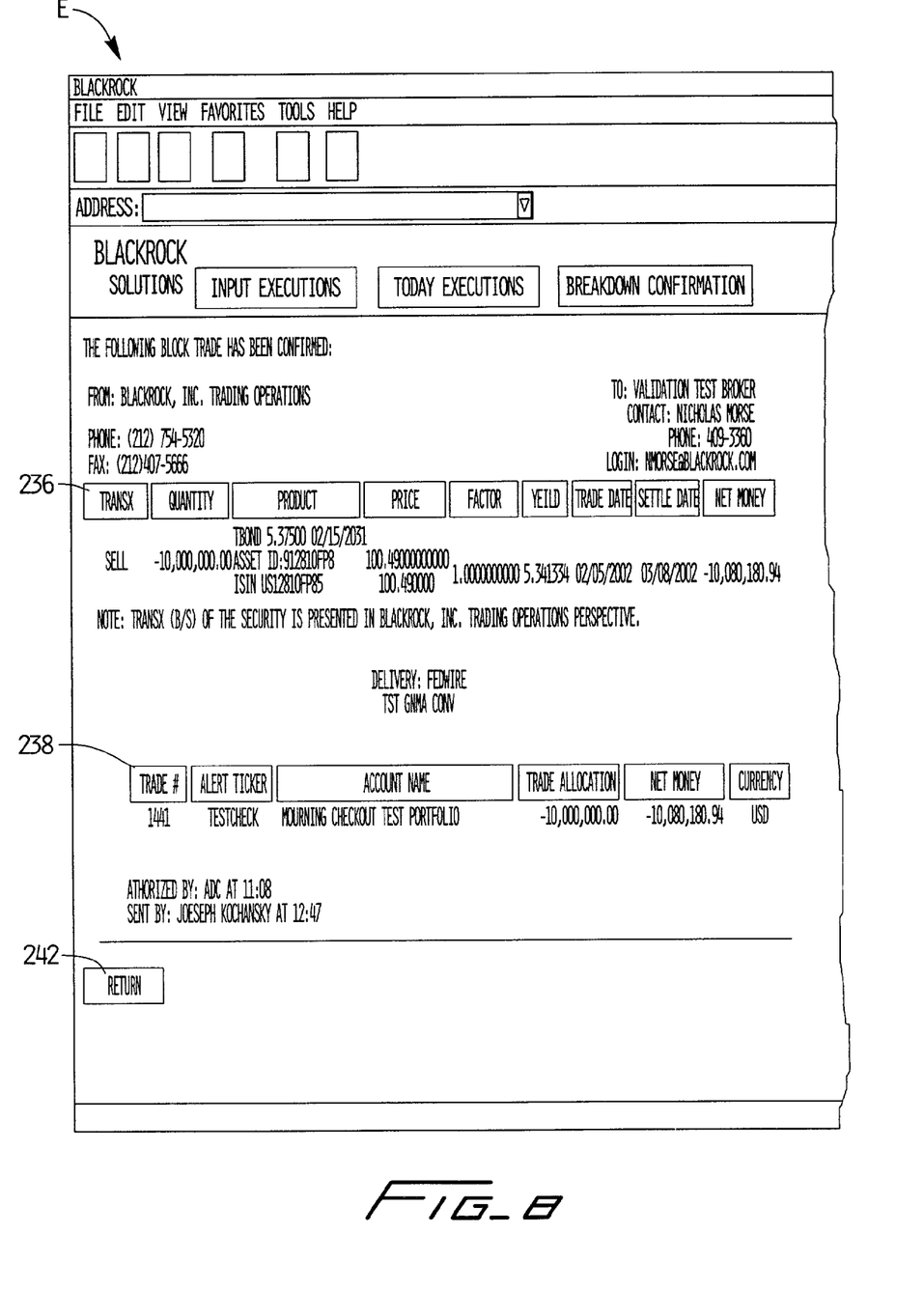
FIG. 8 is an example of a graphical user interface illustrating confirmation of a transaction inputted into a system in accordance with the present disclosure.

FIG. 8 illustrates a screen "E" which displays tables 236 and 238 as in screen D. However, text on screen E indicates that the transaction has been confirmed. Preferably, screen E is displayed after confirming the transaction via actuating confirm button 240. Also, screen E may be accessible by double-clicking or otherwise selecting a transaction in table 234 in screen C.

The system and method of the subject disclosure provides an automated system and method for receiving, matching and confirming the details of each transaction involving financial instruments under management. Although the preferred and exemplary embodiments of the present disclosure have been described with a full set of features, it is to be understood that the disclosed system and method may be practiced successfully without the incorporation of each of those features. It is to be further understood that modifications and variations may be utilized without departure from the spirit and scope of this inventive system and method, as those skilled in the art will readily understand. Such modifications and variations are considered to be within the purview and scope of the appended claims and their equivalents.

What is claimed is:

1. A system for providing automated confirmation of trades involving financial instruments, comprising:
  a) a data input device configured to receive data from counter parties to a trade and to permit each counter party to the trade to independently submit data resulting in a difference of time, wherein the data includes a set of information relating to the trade, the data including names of the counter parties, amounts of financial instruments, prices of financial instruments, type of financial instruments and a portfolio identifier;
  b) a database linked to the data input device and configured to store and pool the data received from the counter parties;
  c) a processor linked to the database and configured to match correspondent sets of information regarding the trade stored and pooled in the database;
  d) a data transmitting device linked to the processor and configured to automatically communicate each matched set of information to at least one of the counter parties to the trade from which one of the sets of information was received so that the at least one of the counter parties can review the matched set of information; and
  e) a data receiving device linked to the processor and configured to automatically receive the data regarding the trade from each counter party receiving the communication;
  f) wherein the processor is further configured to mark the matched sets of information, to exclude the matched sets of information that have been marked from subsequent matching searches in the database, and to receive corrected trade information based on review by the at least one counter party, the corrected trade information being from the at least one of the counter parties to the trade receiving the communication.

2. A system as recited in claim 1, wherein the data input device is configured to receive the data from the counter parties through a distributed computing network.

3. A system as recited in claim 1, further comprising a trade confirmation database for storing the trade confirmation data.

4. A system as recited in claim 1, wherein the data input device forms part of a graphical user interface.

5. A system as recited in claim 1, wherein the data transmitting device is adapted and configured to automatically communicate each matched set of information to at least one of the counter parties to the trade from which one of the sets of information was received through a connection with the world wide web.

6. A system as recited in claim 1, wherein the data transmitting device is adapted and configured to automatically communicate each matched set of information to at least one of the counter parties through a graphical user interface.

7. A system as recited in claim 1, wherein the data receiving device is adapted and configured to receive the trade confirmation data through the world wide web.

8. A system as recited in claim 1, wherein the data input device is configured to receive data from the counter parties through a connection with the world wide web.

9. A system as recited in claim 1, wherein the data further includes CUSIP number and settlement date.

10. A system as recited in claim 9, wherein the processor is configured to match sets of trade information having the same CUSIP number and settlement date.

11. A computer-implemented method for providing automated confirmation of trades involving financial instruments, comprising the steps of:
  a) receiving, by a computer, data from counter parties to a trade, wherein the data includes a set of information relating to a trade involving financial instruments between the counter parties;
  b) storing, by the computer, the data received from the counter parties in a database;
  c) matching, by the computer, correspondent sets of information, the sets of information including CUSIP number, financial instrument share price, quantity of financial instruments involved in the trade, and settlement date;
  d) automatically communicating, by the computer, each of the matched sets of information to at least one of the counter parties to the trade from which one of the sets of information was received;
  e) automatically receiving, by the computer, trade confirmation data from the at least one of the counter parties receiving the communication, the trade confirmation data including information regarding the trade that has been reviewed by the at least one counter party, wherein the information regarding the trade includes the type of transaction, CUSIP number, financial instrument share price, quantity of financial instruments involved in the trade, and settlement date; and
  f) marking, by the computer, each of the matched sets of information and excluding, by the computer, matched sets of information that have been marked from subsequent matching searches in the database.

12. A method as recited in claim 11, further comprising the step of storing the trade confirmation data from the at least one of the counter parties receiving the communication in a trade confirmation database.

13. A method according to claim 11, further comprising the step of providing a means for the counter parties to send data to the database.

14. A method according to claim 11, further comprising the step of providing a graphical user interface for viewing each of the matched sets of information.

15. A method according to claim 11, further comprising the step of providing a web site having an address on the world wide web for viewing each matched set of information.

16. A method according to claim 11, wherein the step of automatically communicating each matched set of information to the at least one of the counter parties to the trade from which one of the sets of information was received includes transmitting data to the world wide web.

17. A system for providing automated confirmation of a trade between a first party and one or more second parties, comprising:
   a) a user interface configured to receive data entered by a first party and one or more second parties, wherein the data includes a set of information relating to the trade involving financial instruments between the first party and each of the one or more second parties;
   b) a database linked to the user interface and configured to store the data entered by the first party and the one or more second parties;
   c) a processor linked to the database and configured to match correspondent sets of information stored in the database;
   d) a data transmitting device linked to the processor and configured to automatically communicate matching sets of information to each of the one or more second parties to the trade; and
   e) a data receiving device linked to the processor and configured to automatically receive confirmation data regarding the set of information relating to the trade from each party receiving the communication;
   f) wherein the processor is further configured to mark the matched sets of information and exclude the matched sets of information that have been marked from subsequent matching searches in the database.

18. A system as recited in claim 17, further comprising a data processing device for receiving trade confirmation data from each of the one or more second parties receiving the communication.

19. A system as recited in claim 18, wherein the data processing device is adapted and configured to receive the trade confirmation data through a connection with the world wide web.

20. A system as recited in claim 18, further comprising a trade confirmation database for storing the trade confirmation data.

21. A system as recited in claim 17, wherein the user interface is a graphical user interface.

22. A system as recited in claim 17, wherein the data transmitting device is adapted and configured to automatically communicate the matching sets of information through the world wide web.

23. A system as recited in claim 17, wherein the data transmitting device is adapted and configured to automatically communicate the matching sets of information to each of the one or more second parties to the trade through a web page on the world wide web.

24. A computer readable medium for providing automated confirmation of trades involving financial instruments, the computer readable medium having executable instructions which when executed cause a computer to perform steps comprising:

i) receiving data from the first party and the second party, wherein the data from the first party includes a set of information relating to a trade involving financial instruments between the first party and the second party and wherein the data from the second party includes a set of information relating to the trade involving financial instruments between the second party and the first party;
   ii) storing the data received from the first party and the second party in a database;
   iii) matching correspondent sets of information stored in the database, the sets of information including CUSIP number, financial instrument share price, quantity of financial instruments involved in the trade, and settlement date;
   iv) automatically communicating each matched set of information to at least one of the first party and the second party;
   v) marking each of the matched sets of information in the database;
   vi) excluding the matched sets of information that have been marked from subsequent matching searches in the database; and
   vii) automatically receiving trade confirmation data from the at least one of the first party and the second party, wherein the step of receiving trade confirmation data includes receiving information regarding the trade that has been reviewed by the at least one of the first party and the second party, the information including the type of transaction, CUSIP number, financial instrument share price, quantity of financial instruments involved in the trade, and settlement date.

25. A system for providing automated confirmation of trades involving financial instruments, the system comprising:
   a) a user interface configured to receive inputs regarding trade information into the system via data entry fields, the data entry fields including a buy/sell field, a security identification field, a trade date field, a settlement date field, a quantity field, and a price field;
   b) a database linked to the user interface and configured to receive and store a plurality of data sets, each data set comprising trade information that includes data entered into each of the plurality of data entry fields for each trade, the trade being a change of ownership of a financial instrument;
   c) a data processing device linked to the database and configured to search the database and match a first data set submitted by a buyer and a second data set submitted by a seller, the first data set and the second data set having the same information in the security identification field, trade date field, settlement date field, quantity field, and price field, the first and second data sets together comprising a matched set; and
   d) a data transmitting device linked to the processor and configured to automatically communicate the matched set to both the buyer and the seller; wherein the user interface includes means allowing at least one of the buyer and seller to review the matched set and confirm the trade;
   e) wherein the data processing device is further configured to mark the matched sets of information and exclude the matched sets of information from subsequent matching searches in the database.

* * * * *